(12) United States Patent
Lentine et al.

(10) Patent No.: US 11,652,330 B1
(45) Date of Patent: May 16, 2023

(54) INTEGRATED SILICON OPTICAL AMPLIFIER WITH REDUCED RESIDUAL PUMP

(71) Applicants: National Technology & Engineering Solutions of Sandia, LLC, Albuquerque, NM (US); Yale University, New Haven, CT (US)

(72) Inventors: Anthony L. Lentine, Albuquerque, NM (US); Michael Gehl, Albuquerque, NM (US); Peter Rakich, New Haven, CT (US); Shai Gertler, New Haven, CT (US); Nils Otterstrom, Albuquerque, NM (US)

(73) Assignees: National Technology & Engineering Solutions of Sandia, LLC, Albuquerque, NM (US); Yale University, New Haven, CT (US)

( * ) Notice: Subject to any disclaimer, the term of this patent is extended or adjusted under 35 U.S.C. 154(b) by 381 days.

(21) Appl. No.: 17/098,577

(22) Filed: Nov. 16, 2020

Related U.S. Application Data (60) Provisional application No. 62/957,837, filed on Jan. 7, 2020.

(51) Int. Cl.
| | | |
|---|---|---|
| *H01S 3/00* | (2006.01) | |
| *H01S 3/30* | (2006.01) | |
| *H01S 3/091* | (2006.01) | |
| *H01S 3/23* | (2006.01) | |
| *H01S 3/063* | (2006.01) | |

(52) U.S. Cl.
CPC .............. *H01S 3/30* (2013.01); *H01S 3/0637* (2013.01); *H01S 3/091* (2013.01); *H01S 3/2308* (2013.01)

(58) Field of Classification Search
None
See application file for complete search history.

(56) References Cited

U.S. PATENT DOCUMENTS

| 11,114,815 | B1* | 9/2021 | Chen | ..................... H01S 3/0637 |
| 2021/0063776 | A1* | 3/2021 | Larson | ..................... H01S 5/50 |

OTHER PUBLICATIONS

Kittlaus, E. A. et al., "Large Brillouin amplification in silicon," Nature Photonics (2016) 10:463-468.

(Continued)

*Primary Examiner* — Mark Hellner
(74) *Attorney, Agent, or Firm* — Mark A. Dodd (57) ABSTRACT

An optical amplifier device employing a Mach-Zehnder Interferometer (MZI) that reduces the amount of residual pump power in the optical output of the amplifier is disclosed. The MZI amplifier employs two geometrically linear optical amplifier arms or two multi-spatial-mode racetrack optical amplifiers to amplify a signal with a pumping beam, with the signal output port having extremely low levels of residual pump power. The MZI optical amplifier is a silicon photonic integrated circuit, with all optical amplifiers, couplers, phase shifters, and optical attenuators formed of silicon photonic integrated circuit elements. The MZI optical amplifier may include one, two, or three MZI stages, and multiple MZI optical amplifiers may be used in parallel or sequentially to achieve higher overall signal gain or power. The MZI optical amplifier may employ Brillouin-scattering-based amplifiers, Raman-based integrated waveguide optical amplifiers, or Erbium-doped integrated waveguide optical amplifiers.

20 Claims, 7 Drawing Sheets

(56) References Cited

OTHER PUBLICATIONS

Liu, S. et al., "High speed ultra-broadband amplitude modulators with ultrahigh extinction >65 dB," Optics Express (2017) 25(10):11254-11264.
Otterstrom, N T. et al., "Resonantly enhanced nonreciprocal silicon Brillouin amplifier," Optica (2019) 6(9):1117-1123.
Wilkes, C. M. et al., "60 dB high-extinction auto-configured Mach-Zehnder interferometer," Optics Letters (2016) 41(22):5318-5321.
Zhou, Y. et al., "Modeling and optimization of a single-drive push-pull silicon Mach-Zehnder modulator," Photon. Res. (2016) 4(4):153-161.

\* cited by examiner

INTEGRATED SILICON OPTICAL AMPLIFIER WITH REDUCED RESIDUAL PUMP

RELATED APPLICATIONS

This application claims priority to U.S. Provisional Application No. 62/957,837, filed on Jan. 7, 2020, and entitled INTEGRATED SILICON OPTICAL AMPLIFIER WITH REDUCED RESIDUAL PUMP, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to an optical amplifier device employing a Mach-Zehnder Interferometer (MZI) that reduces the amount of residual pump power in the optical output of the amplifier. Further, the MZI optical amplifier is a silicon photonic integrated circuit.

BACKGROUND

Silicon photonic integrated circuits offer great potential as they can draw from decades of work on silicon-based electronic devices. However, due to the indirect bandgap of Si, its use in certain types of photonic devices is limited. In particular, researchers have struggled to develop optical amplifiers using silicon-based structures.

With careful structural design in subwavelength silicon photonic devices, Brillouin nonlinearities can be greater than all other nonlinear processes. Further, Brillouin interactions can readily be tailored, leading to a range of hybrid photonic-phononic signal processing operations that have no analogue in purely optical signal processing.

However, strong Brillouin-based optical amplification, a process that is essential to many Brillouin-based technologies, has yet to be realized in silicon photonics without high residual pump power. Among the more relevant work is E. A. Kittlaus, et al., Large Brillouin amplification in silicon, Nature Photonics, vol. 10, pp. 463-468 (2016), the contents of which are incorporated herein by reference. Kittlaus discloses a geometrically linear, membrane-suspended silicon waveguide that controls the interaction between guided photons and phonons. This optical amplifier produced greater than 5 dB of gain at modest pump powers and demonstrated a 5 mW pumping threshold for net optical amplification.

Figure 1A:
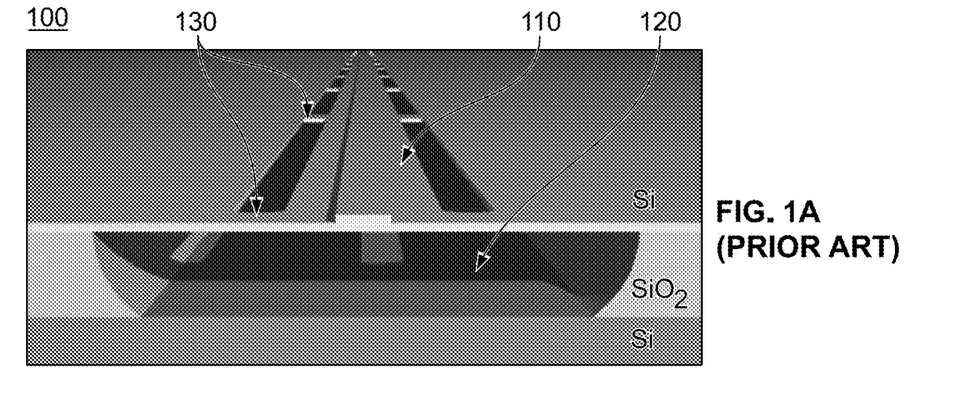
FIGS. 1A-1G illustrate aspects and embodiments of prior art Brillouin-scattering-based optical amplifiers.
Figure 1B:
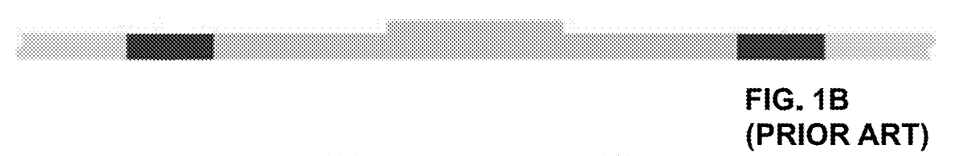
Figure 1C:
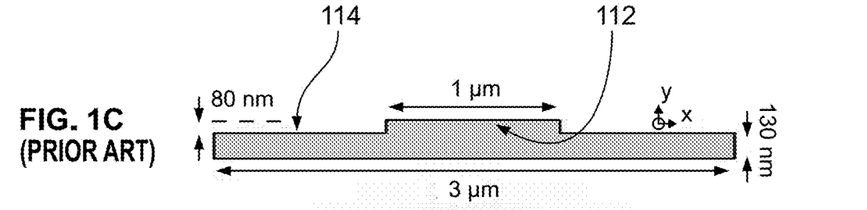
Figure 1D:
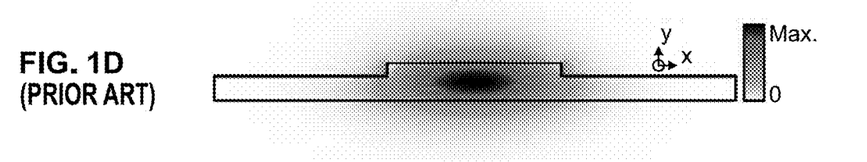
Figure 1E:
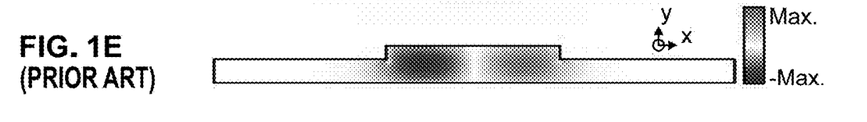
Figure 1F:
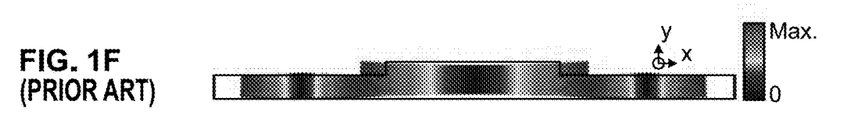

The Kittlaus Brillouin-active waveguide 100, illustrated in FIGS. 1A-1F, consists of a silicon waveguide 110 continuously suspended over a cavity 120 over a length of greater than 1 cm by a series of tethers 130 as illustrated in FIG. 1A. The active region of the silicon waveguide 110, and its corresponding dimensions, is illustrated in FIG. 1C. Light is confined to the central ridge waveguide 112 through total internal reflection, which guides the low-loss transverse electric-like (TE-like) optical mode at an operating optical wavelength of 1.55 µm the horizontal magnitude of which is illustrated in FIG. 1D. FIG. 1E illustrates the electrostrictive optical force distribution generated by this TE-like mode. These electrostrictive optical forces ensure efficient coupling between the TE-like optical mode of FIG. 1D and the guided phonon mode illustrated in FIG. 1F at GHz frequencies. The guided phonon mode is confined to the silicon waveguide 110 due to the large mismatch between the acoustic impedances of the silicon waveguide 110 and the air in the cavity 120. As the optical mode is confined to the 1 µm wide central ridge waveguide 112, and the phonon mode extends throughout the 3 µm wide membrane 114, the photon and phonon modes can be tailored independently. This independent control is used to minimize the sensitivity of the TE-like optical mode to sidewall roughness while maximizing photon-phonon coupling.

Figure 1G:
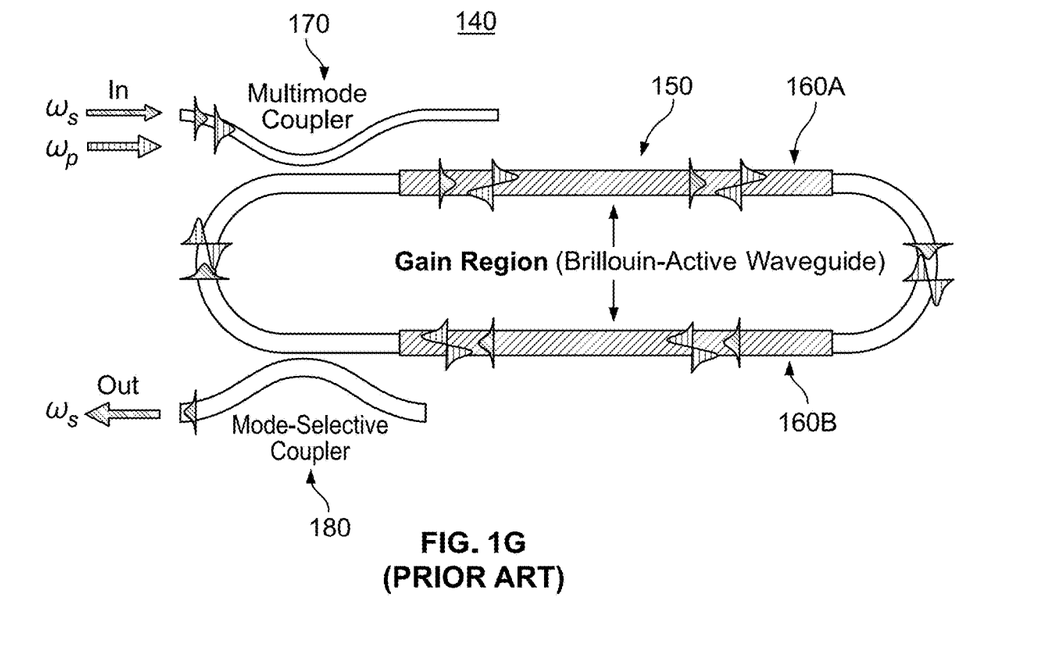

While Kittlaus demonstrated optical gain using Brillouin scattering processes, the resultant output included a large component at the pump wavelength. The output ratio of amplified signal power to pump power can be improved by two methods. The first is to increase the optical amplified signal power, i.e., increase the gain of the device, while the second is to more completely cancel, i.e., filter out, the pump wavelength. N. T. Otterstrom, et al., Resonantly enhanced nonreciprocal silicon Brillouin amplifier, Optica, vol. 6, no. 9, pp. 1117-1123 (2019), the contents of which are incorporated herein by reference, discloses a device geometry that addresses both improvement methods. Otterstrom's optical amplifier 140 is composed of a multi-spatial-mode racetrack resonator 150 with two straight Brillouin-active regions 160A, 160B like that employed by Kittlaus, as illustrated in FIG. 1G. Using the frequency selectivity of the cavity, pump ($\omega_p$) and signal ($\omega_s$) waves are coupled into the antisymmetric and symmetric cavity modes, respectively, via a multimode input coupler 170. As the pump and signal waves traverse the Brillouin-active regions 160A, 160B, the pump wave resonantly amplifies the signal wave through stimulated intermodal Brillouin scattering. The signal wave exits the multi-spatial-mode racetrack resonator 150 through a mode-selective output coupler 180, which is designed to couple strongly to the symmetric (signal) mode and weakly to the antisymmetric (pump) mode.

This suspended multimode silicon waveguide supports two transverse electric-like (TE-like) optical spatial modes and a 6 GHz antisymmetric Lamb-like elastic wave, which mediates intermodal Brillouin optical amplification. Coupling into the multi-spatial-mode racetrack resonator 150 via the multimode input coupler 170 yields a characteristic multimode transmission spectrum at the output port, with broad (centered at $\omega_2'''$) and narrow (centered at $\omega_1'''$) resonances corresponding to the antisymmetric and symmetric optical spatial modes, respectively. The mode-selective drop coupler 180 is designed to couple out only the symmetric cavity modes (centered at $\omega_1'''$).

Despite the progress demonstrated by both Kittlaus and Otterstrom, the need still exists for an optical amplifier employing silicon photonics with a further improved output ratio of amplified signal power to pump power.

SUMMARY

One aspect of the present invention relates to an optical amplifier employing a silicon photonic integrated circuit with a device geometry that further improves the ratio of amplified signal power to pump power. This is achieved primarily by more nearly canceling out the pump power at the output.

In at least one embodiment of the present invention, this improved pump power canceling at the output is achieved using a Mach-Zehnder Interferometer (MZI) with optical amplifiers in each arm of the MZI. Assuming both couplers of the MZI have a perfect 50-50 splitting ratio and that both optical amplifiers have identical gain regions, then there will be no pump power at the signal output, though the effective gain will be only half of that achieved by a geometrically linear device of the same length, i.e., a device like the Kittlaus Brillouin-active waveguide 100.

In at least one embodiment of the present invention, a Mach-Zehnder interferometer optical amplifier comprises an input coupler (the input coupler receiving an input signal and a pump beam and coupling approximately a 50:50 split of the input signal and the pump beam to each of first and second input coupler outputs), first and second optical amplifiers (the optical amplifiers including respective first and second optical amplifier inputs optically connected to respective first and second input coupler outputs, the optical amplifiers amplifying the input signal and outputting the amplified input signal from respective first and second optical amplifier outputs), and an output coupler optically (the output optical coupler connected to the first and second optical amplifier outputs, the output coupler coupling approximately all of the amplified input signal to an amplified signal output port and approximately all of a remaining portion of the pump beam to a pump output port), the Mach-Zehnder interferometer optical amplifier being a silicon photonic integrated circuit.

In various embodiments of the present invention: the first and second optical amplifiers include a Brillouin-scattering-based optical amplifier, a Raman-based integrated waveguide optical amplifier, or an Erbium-doped integrated waveguide optical amplifier; at least one of the first and second optical amplifiers includes a phase shifter (the phase shifter shifting a phase of a received optical beam); and at least one of the first and second optical amplifiers includes an optical attenuator (the optical attenuator attenuating an optical magnitude of a received optical beam).

In other embodiments of the present invention: the Mach-Zehnder interferometer optical amplifier further comprises at least one post-output phase shifter (each post-output phase shifter optically coupled to a respective one of the amplified signal output port and the pump output port, each of the at least one post-output phase shifters shifting a phase of a received optical beam), and a post-output coupler (the post-output coupler optically coupled to the at least one post-output phase shifter, the post-output coupler coupling approximately all of the amplified input signal to an amplified signal post-output port and approximately all of the remaining portion of the pump beam to a pump post-output port).

In yet other embodiments of the present invention: each of the first and second optical amplifiers has a geometrically linear configuration; each optical amplifier having a geometrically linear configuration comprising a multimode input coupler (the multimode input coupler optically connected to a respective one of the first and second input coupler outputs), a geometrically linear optical amplifier (the multimode input coupler optically coupling a portion of the input signal and a portion of the pump beam to the geometrically linear optical amplifier), and a mode-selective output coupler (the mode-selective output coupler optically coupling the amplified input signal from the geometrically linear optical amplifier to a respective one of the first and second optical amplifier outputs).

In still other embodiments of the present invention: each of the first and second optical amplifiers has a racetrack configuration; each optical amplifier having the racetrack configuration comprising a multimode input coupler (the multimode input coupler optically connected to a respective one of the first and second input coupler outputs), a multi-spatial-mode racetrack optical amplifier (the multimode input coupler optically coupling a portion of the input signal and a portion of the pump beam to the multi-spatial-mode racetrack optical amplifier), the multi-spatial-mode racetrack optical amplifier includes first and second geometrically linear optical amplifiers, and first and second curved waveguides (the first and second curved waveguides forming an oval with the first and second geometrically linear optical amplifiers), and a mode-selective output coupler (the mode-selective output coupler optically coupling the amplified input signal from the multi-spatial-mode racetrack optical amplifier to a respective one of the first and second optical amplifier outputs).

In certain embodiments of the present invention: each of the first and second optical amplifiers comprises a Brillouin-scattering-based optical amplifier, each of the Brillouin-scattering-based optical amplifiers including a membrane, a central ridge waveguide (the central ridge waveguide being on the membrane and optically connected to a respective one of the first and second input coupler outputs and a respective one of the first and second optical amplifier outputs), and one or more tethers or phononic crystals (the one or more tethers or phononic crystals suspending the membrane and the central ridge waveguide over a cavity); and the membrane includes a p-doped region (the p-doped region being along a first side of the membrane) and an n-doped region (the n-doped region being along a second side of the membrane opposite the first side, the p-doped region and the n-doped region each receiving a bias to sweepout carriers), the central ridge waveguide being undoped.

In various embodiments of the present invention: the first and second optical amplifiers comprises a Brillouin-scattering-based amplifier, the Brillouin-scattering-based amplifier including a membrane, a first central ridge waveguide (the first central ridge waveguide being on the membrane and optically connected to the first input coupler output and to the first optical amplifier output), a second central ridge waveguide (the second central ridge waveguide being on the membrane and parallel to the first central ridge waveguide, the second central ridge optical waveguide optically connected to the second input coupler output and to the second optical amplifier output), and one or more tethers or phononic crystals (the one or more tethers or phononic crystals suspending the membrane, the first central ridge waveguide, and the second central ridge waveguide over a cavity).

In at least one embodiment of the present invention, a Mach-Zehnder interferometer optical amplifier comprises a first stage input coupler (the first stage coupler receiving an input signal and a pump beam and coupling approximately a 50:50 split of the input signal and the pump beam to each of first and second first stage input coupler outputs), a pair of second stage input couplers (each of the pair of second stage input couplers optically connected to a respective one of the first and second first stage input coupler outputs, each of the pair of second stage input couplers coupling approximately a 50:50 split of the input signal received from a respective one of the first and second first stage input coupler outputs and the pump beam received from a respective one of the first and second first stage input coupler outputs to each of first and second second stage input coupler outputs), first through fourth optical amplifiers (each of the optical amplifiers including respective first through fourth optical amplifier inputs optically connected to a respective one of the second stage input coupler outputs, each of the first through fourth optical amplifiers amplifying the input signal and outputting the amplified input signal from respective first through fourth optical amplifier outputs), a pair of second stage output couplers (the pair of second stage output couplers optically connected to the first through fourth optical amplifier outputs, each of the pair of second stage output couplers coupling approximately all of the amplified input signal to a second stage output coupler amplified signal output port and to approximately all of a remaining portion of the pump beam to a second stage output coupler pump output port), and a first stage output coupler (the first stage output coupler optically connected to each of the second stage output coupler amplified signal output ports and coupling approximately all of the amplified input signal to a first stage output coupler amplified signal output port and approximately all of a remaining portion of the pump beam to a first stage output coupler pump output port), the Mach-Zehnder interferometer optical amplifier being a silicon photonic integrated circuit.

In various embodiments of the present invention: each of the first through fourth optical amplifiers has a geometrically linear configuration; each optical amplifier having the geometrically linear configuration comprising a multimode input coupler (the multimode input coupler optically connected to a respective output of one of the pair of second stage input couplers), a geometrically linear optical amplifier (the multimode input coupler optically coupling a portion of the input signal and a portion of the pump beam to the geometrically linear optical amplifier), and a mode-selective output coupler (the mode-selective output coupler optically coupling the amplified input signal from the geometrically linear optical amplifier to a respective one of the first through fourth optical amplifier outputs).

In still other embodiments of the present invention: each of the first through fourth optical amplifiers has a racetrack configuration, each optical amplifier having the racetrack configuration comprising a multimode input coupler (the multimode input coupler optically connected to a respective output of one of the pair of second stage input couplers), a multi-spatial-mode racetrack optical amplifier (the multimode input coupler optically coupling a portion of the input signal and a portion of the pump beam to the multi-spatial-mode racetrack optical amplifier), the multi-spatial-mode racetrack optical amplifier includes first and second geometrically linear optical amplifiers (each of the geometrically linear optical amplifiers having a geometrically linear configuration), and first and second curved waveguides (the first and second curved waveguides forming an oval with the first and second geometrically linear optical amplifiers), and a mode-selective output coupler (the mode-selective output coupler optically coupling the amplified input signal from the multi-spatial-mode racetrack optical amplifier to a respective one of the first through fourth optical amplifier outputs).

In at least one embodiment of the present invention, a Mach-Zehnder interferometer optical amplifier comprises a first stage Mach-Zehnder Interferometer (MZI), the first stage MZI includes a first stage MZI input coupler (the first stage MZI input coupler receiving an input signal and a pump beam and coupling approximately a 50:50 split of the input signal and the pump beam to each of first and second first stage MZI input coupler outputs), at least one first stage MZI phase shifter (each of the at least one first stage MZI phase shifters optically connected to a respective one of the first and second first stage MZI input coupler outputs and shifting a phase of a received optical beam), and a second stage MZI, the second stage MZI includes a second stage MZI input coupler (the second stage MZI input coupler optically connected to the first stage MZI and coupling approximately a 50:50 split of the input signal and the pump beam to each of first and second second stage MZI input coupler outputs), first and second optical amplifiers (the optical amplifiers including respective first and second optical amplifier inputs optically connected to respective first and second second stage MZI input coupler outputs, the optical amplifiers amplifying the input signal and outputting the amplified input signal from respective first and second optical amplifier outputs), and a second stage MZI output coupler (the second stage MZI output coupler optically connected to the first and second optical amplifier outputs and coupling approximately all of the amplified input signal to a second stage MZI amplified signal output port and approximately all of a remaining portion of the pump beam to a second stage MZI pump output port), the Mach-Zehnder interferometer optical amplifier being a silicon photonic integrated circuit.

In various embodiments of the present invention: each of the first and second optical amplifiers has a geometrically linear configuration; each optical amplifier having the geometrically linear configuration comprising a multimode input coupler (each multimode input coupler optically connected to a respective one of the first and second second stage MZI input coupler outputs), a geometrically linear optical amplifier (the multimode input coupler optically coupling a portion of the input signal and a portion of the pump beam to the geometrically linear optical amplifier), and a mode-selective output coupler (the mode-selective output coupler optically coupling the amplified input signal from the geometrically linear optical amplifier to a respective one of the first and second optical amplifier outputs).

In still other embodiments of the present invention: each of the first and second optical amplifiers has a racetrack configuration, each optical amplifier having the racetrack configuration comprising a multimode input coupler (the multimode input coupler optically connected to a respective one of the first and second input coupler outputs), a multi-spatial-mode racetrack optical amplifier (the multimode input coupler optically coupling a portion of the input signal and a portion of the pump beam to the multi-spatial-mode racetrack optical amplifier), the multi-spatial-mode racetrack optical amplifier includes first and second geometrically linear optical amplifiers, and first and second curved waveguides (the first and second curved waveguides forming an oval with the first and second geometrically linear optical amplifiers), and a mode-selective output coupler (the mode-selective output coupler optically coupling the amplified input signal from the multi-spatial-mode racetrack optical amplifier to a respective one of the first and second optical amplifier outputs).

In yet other embodiments of the present invention: the Mach-Zehnder interferometer further comprises a third stage MZI, the third stage MZI including at least one third stage MZI phase shifter (each of the at least one third stage MZI phase shifters optically connected to a respective one of the second stage MZI amplified signal output port and the second stage MZI pump output port, each of the at least one third stage MZI phase shifters shifting a phase of a received optical beam), and a third stage MZI output coupler (the third stage MZI output coupler optically connected to the at least one third stage MZI phase shifter and coupling approximately all of the amplified input signal to a third stage MZI amplified signal output port and approximately all of a remaining portion of the pump beam to a third stage MZI pump output port).

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Figure 2:
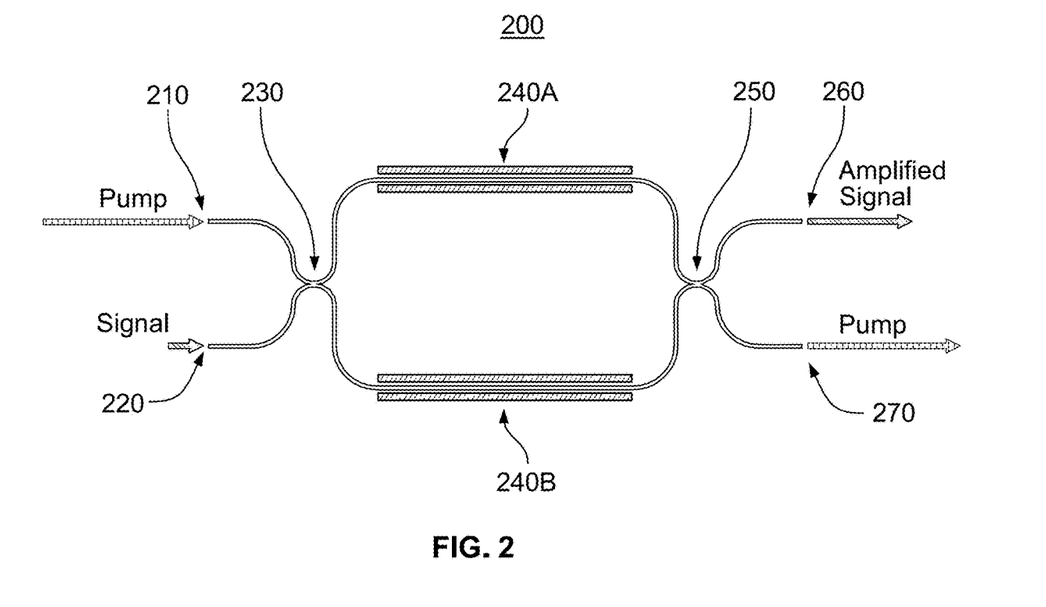
FIG. 2 illustrates a Brillouin-scattering-based optical amplifier having a Mach-Zehnder Interferometer configuration in accordance with one or more embodiments of the present invention.

FIG. 2 illustrates a Brillouin-scattering-based optical amplifier having a MZI configuration 200 in accordance with an embodiment of the present invention. The MZI optical amplifier 200 includes a pump input port 210, a signal input port 220, an input coupler 230, first and second Brillouin-scattering-based geometrically linear optical amplifiers 240A, 240B, an output coupler 250, an amplified signal output port 260, and a pump output port 270. A perfect input coupler 230 would direct exactly 50% of the pump power and exactly 50% of the signal power to both the first and second Brillouin-scattering-based geometrically linear optical amplifiers 240A, 240B. Assuming identical gain regions in the first and second Brillouin-scattering-based geometrically linear optical amplifiers 240A, 240B, a perfect output coupler 250 would direct all of the remaining portion of the pump power to the pump output port 270 while directing all of the amplified signal power to the amplified signal output port 260.

The input coupler 230 and the output coupler 250 may be any type of coupler that results in a perfect (or near perfect) 50:50 split between the input ports 210, 220 and the output ports 260, 270. In a preferred embodiment of the present invention, the input coupler 230 and the output coupler 250 are of the multi-mode interference type.

The first and second Brillouin-scattering-based geometrically linear optical amplifiers 240A, 240B preferably employ a silicon waveguide continuously suspended in a cavity, such as that employed by Kittlaus. The dimensions of a central ridge waveguide and a membrane that form the silicon waveguide depend upon the operating optical wavelength of the MZI optical amplifier 200 and the phonon wavelength. Example width dimensions for the central ridge waveguide and the membrane are 1 µm and 3 µm, respectively, for an operating optical wavelength of approximately 1.5 µm and a phonon frequency of 4-6 GHz. Example thicknesses for the central ridge waveguide and the membrane are 80 nm and 130 nm, respectively. The first and second Brillouin-scattering-based geometrically linear optical amplifiers 240A, 240B preferably have lengths of at least 7 mm, though the specific length is, at least in part, a function of the desired signal gain.

Figure 3:
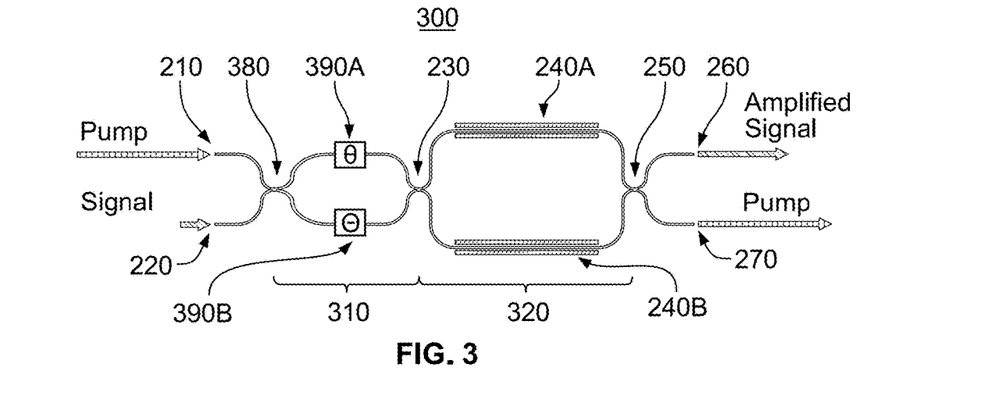
FIG. 3 illustrates a Brillouin-scattering-based optical amplifier having two sequential Mach-Zehnder Interferometers in accordance with one or more embodiments of the present invention.

Due to variations in the fabrication process, achieving a perfect 50:50 split in both the input coupler 230 and the output coupler 250 will be extremely difficult, with more likely splitting ratios being between 45:55 and 55:45. A splitting ratio between 45:55 and 55:45 will be considered to be approximately a 50:50 split. To counter these fabrication variations, FIG. 3 illustrates a Brillouin-scattering-based optical amplifier having a MZI configuration 300 like the MZI optical amplifier 200 illustrated in FIG. 2, but that includes two sequential MZI stages 310, 320. The first MZI stage 310 of MZI optical amplifier 300 acts as a variable pre-input coupler. The first MZI stage 310 includes a first stage MZI coupler 380 and a pair of first stage MZI phase shifters 390A, 390B. The pump beam from the pump input port 210 and the signal beam from the signal input port 220 would pass through the first stage MZI coupler 380 and be split in a realistic splitting ratio between 45:55 and 55:45 to each of the first stage MZI phase shifters 390A, 390B. See, for example, S. Liu, et al., "High speed ultra-broadband amplitude modulators with ultrahigh extinction >65 dB," Optics Express, vol. 25, no. 10, pp. 11254-11264 (2017), the contents of which are incorporated herein by reference, for a discussion of enhanced rejection using an additional coupler and pair of phase shifters.

The pair of first stage MZI phase shifters 390A, 390B may be implemented in various ways. In the illustrated embodiment of FIG. 3, the bias applied to each of the pair of first stage MZI phase shifters 390A, 390B is independently controlled, resulting in each of the pair of first stage MZI phase shifters 390A, 390B providing different amounts of phase shifting, i.e., θ and Θ, respectively. In some embodiments, the pair of first stage MZI phase shifters 390A, 390B are of the push-pull type, in which a given positive bias $+V_1$ is applied to one of the pair of first stage MZI phase shifters 390A, 390B, while the opposite negative bias $-V_1$ is applied to the other of the pair of first stage MZI phase shifters 390A, 390B. This approach permits use of lower biases when electro-optical phase shifters are employed. See, for example, Y. Zhou, et al., "Modeling and optimization of a single-drive push-pull silicon Mach-Zehnder modulator," Photonics Research, vol. 4, no. 4, pp. 153-161 (2016), the contents of which are incorporated herein by reference, for a discussion of push-pull type phase shifters. Alternatively, some embodiments of the present invention (not illustrated) may employ a single first stage MZI phase shifter, though the magnitude of the bias required to operate this single first stage MZI phase shifter may be twice as great as that required for the push-pull type electro-optic embodiment just described.

Figure 4:
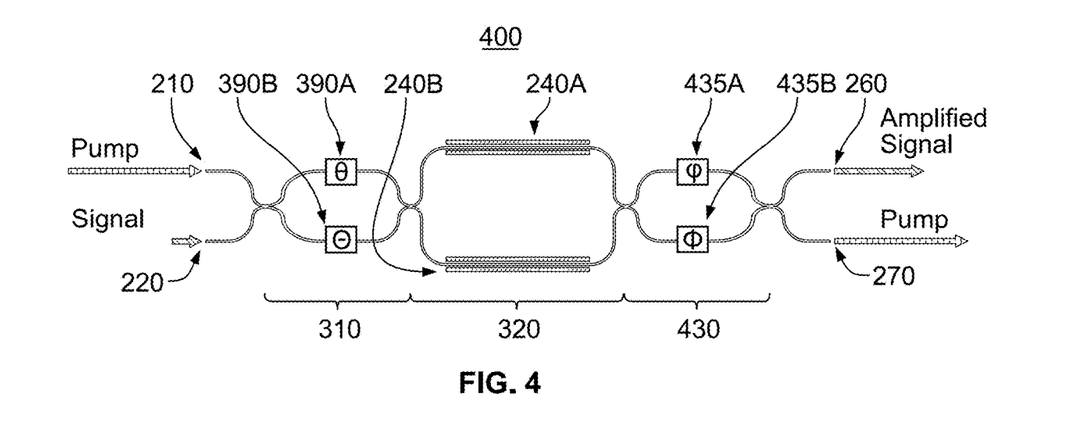
FIG. 4 illustrates a Brillouin-scattering-based optical amplifier having three sequential Mach-Zehnder Interferometers in accordance with one or more embodiments of the present invention.

In yet another embodiment of the present invention that addresses the imperfect cancellation of the pump beam in a MZI due to fabrication variations, FIG. 4 illustrates a MZI optical amplifier 400 that includes three sequential MZI stages 310, 320, 430, in which the first and last MZI stages 310, 430 act as variable pre-input and post-output couplers, respectively. See, for example, C. M. Wilkes, et al., "60 dB high-extinction auto-configured Mach-Zehnder interferometer," Optics Letters, vol. 41, no. 22, pp. 5318-5321 (2016), the contents of which are incorporated herein by reference, for a discussion of enhanced rejection using additional phase shifters. The middle MZI stage 320 may, for example, correspond to the MZI optical amplifier 200 illustrated in FIG. 2. Because the phase shifters 390A, 390B, 435A, 435B in the first and last MZI stages 310, 430, respectively, may be individually actively tuned, the pump rejection at the signal output port 260 may be greater than 50 dB. The phase shifters 390A, 390B, 435A, 435B may be of the thermo-optic type or electro-optic type. As with the embodiment illustrated in FIG. 3, the embodiment in FIG. 4 may employ only a single phase shifter 390A, 435A in the first and/or last MZI stages 310, 430 as opposed to the illustrated pairs of phase shifters 390A, 390B, 435A, 435B. In yet other embodiments of the present invention, the Brillouin-scattering-based optical amplifier may employ only the middle and last MZI stages 320, 430 of the embodiment illustrated in FIG. 4.

Figure 5:
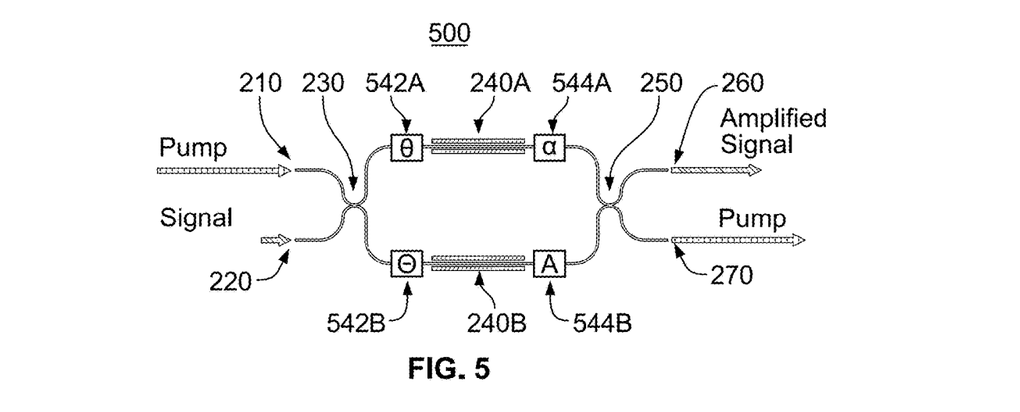
FIG. 5 illustrates a Brillouin-scattering-based optical amplifier having a Mach-Zehnder Interferometer configuration with both phase shifters and optical attenuators in accordance with one or more embodiments of the present invention.

In certain embodiments of the present invention, the phase and/or the amplitude may be adjusted within the MZI optical amplifier 500 as illustrated in FIG. 5. As with the MZI optical amplifier 200, the MZI optical amplifier 500 includes a pump input port 210, a signal input port 220, an input coupler 230, first and second Brillouin-scattering-based geometrically linear optical amplifiers 240A, 240B, an output coupler 250, an amplified signal output port 260, and a pump output port 270. As will be appreciated by those of ordinary skill in the art, slight variations in the gain and phase of the first and second Brillouin-scattering-based geometrically linear optical amplifiers 240A, 240B will reduce the effectiveness of the MZI pump beam cancellation. These slight variations in the gain and phase of the first and second Brillouin-scattering-based geometrically linear optical amplifiers 240A, 240B can be countered by the inclusion of a pair of phase shifters 542A, 542B and a pair of optical attenuators 544A, 544B. Thus, the MZI optical amplifier 500 includes the pair of phase shifters 542A, 542B located between the input coupler 230 and the output coupler 250, with one of the pair of phase shifters 542A, 542B located in each arm of the MZI optical amplifier 500.

In like manner, the MZI optical amplifier 500 includes the pair of optical attenuators 544A, 544B located between the input coupler 230 and the output coupler 250, with one of the pair of optical attenuators 544A, 544B located in each arm of the MZI optical amplifier 500.

As with the embodiments illustrated in FIGS. 3 and 4, the pair of phase shifters 542A, 542B can be of the independent type, the push-pull type, or a single phase shifter 542A may be used without a corresponding second phase shifter 542B. The pair of optical attenuators 544A, 544B may be implemented using a forward biased lateral p-i-n structure of the type illustrated in FIG. 10. By forward biasing the lateral p-i-n structure, excess carriers are injected into the optical path, thereby increasing non-linear losses and attenuating the optical signal. To the extent that the first and second Brillouin-scattering-based geometrically linear optical amplifiers 240A, 240B vary in phase only, then only the pair of phase shifters 542A, 542B need be included. Similarly, to the extent that first and second Brillouin-scattering-based geometrically linear optical amplifiers 240A, 240B vary in gain only, then only the pair of optical attenuators 544A, 544B need be included.

Figure 6:
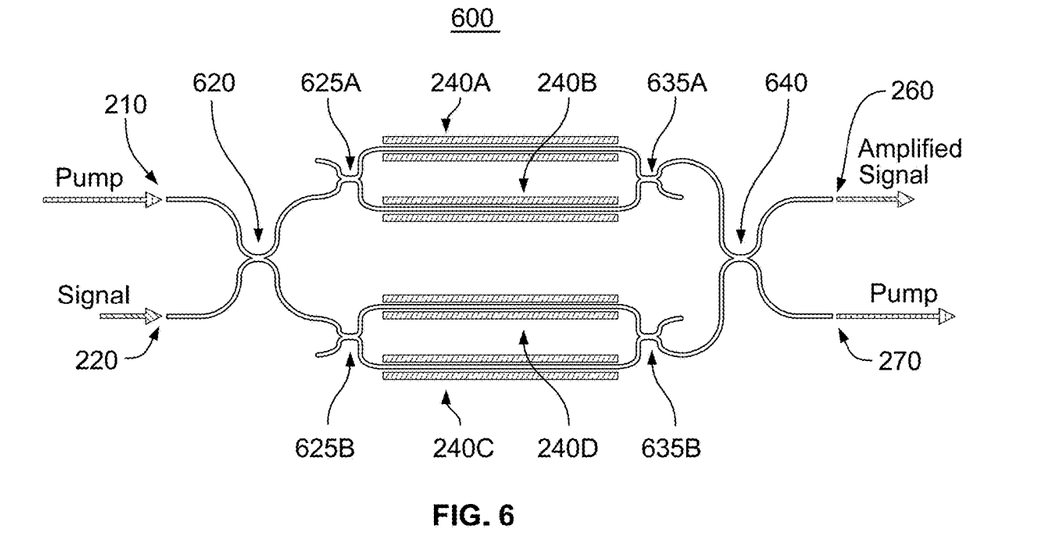
FIG. 6 illustrates a Brillouin-scattering-based optical amplifier having two Mach-Zehnder Interferometers in parallel in accordance with one or more embodiments of the present invention.

As non-linear losses can significantly impact gain and power handling, some embodiments of the present invention, such as that illustrated in FIG. 6, employ more than two Brillouin-scattering-based geometrically linear optical amplifiers. The four arm MZI optical amplifier 600 includes essentially two of the MZI optical amplifiers 200 illustrated in FIG. 2 in parallel. This four arm MZI optical amplifier 600 includes a pump input port 210, a signal input port 220, a first stage input coupler 620, a pair of second stage input couplers 625A, 625B, first through fourth Brillouin-scattering-based geometrically linear optical amplifiers 240A-240D, a pair of second stage output couplers 635A, 635B, a first stage output coupler 640, an amplified signal output port 260, and a pump output port 270. Operation of the four arm MZI optical amplifier 600 is similar to the operation of the MZI optical amplifier 200, with the obvious difference of additional couplers allowing operation in parallel.

As with the MZI optical amplifier 500 illustrated in FIG. 5, the four arm MZI optical amplifier 600 illustrated in FIG. 6 may also optionally include both phase shifters (not illustrated) and optical attenuators (not illustrated) in each arm to further improve the rejection of the pump beam at the amplified signal output port 260.

Figure 7:
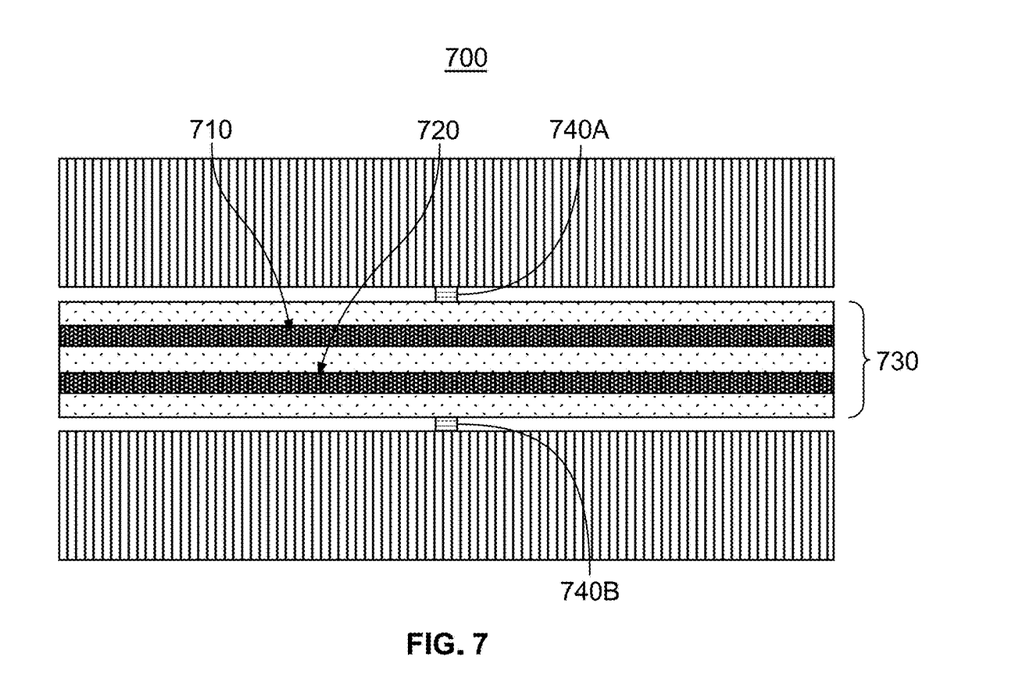
FIG. 7 is a plan view of a dual-core waveguide in accordance with one or more embodiments of the present invention.

In a similar fashion to decrease non-linear losses, the embodiment in FIG. 7 employs a dual-core waveguide instead of a single core waveguide within the Brillouin-scattering-based geometrically linear optical amplifiers. As illustrated in FIG. 7, the overall dual-core silicon waveguide 700 includes two parallel individual central ridge waveguides 710, 720 on a single membrane 730 suspended by tethers 740A, 740B over a cavity (not illustrated). Example width dimensions for the two individual central ridge waveguides 710, 720 and the membrane 730 are 1 µm and 5 µm, respectively, for an operating optical wavelength of approximately 1.5 µm and a phonon frequency of 4-6 GHz. Example thicknesses for the two individual central ridge waveguides 710, 720 and the membrane 730 are 80 nm and 130 nm, respectively.

Figure 8:
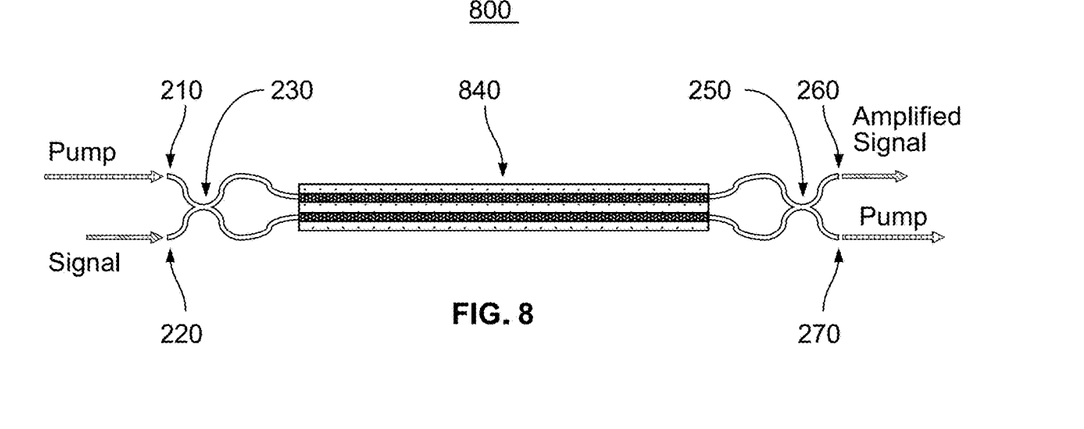
FIG. 8 is a plan view of a Brillouin-scattering-based optical amplifier having a Mach-Zehnder Interferometer configuration with a dual-core waveguide in accordance with one or more embodiments of the present invention.

The MZI optical amplifier 800 illustrated in FIG. 8 employs the dual-core silicon waveguide 700 illustrated in FIG. 7 in conjunction with the general overall layout of the MZI optical amplifier 200 illustrated in FIG. 2. The MZI amplifier optical 800 includes a pump input port 210, a signal input port 220, an input coupler 230, a Brillouin-scattering-based geometrically linear dual-core waveguide optical amplifier 840, an output coupler 250, an amplified signal output port 260, and a pump output port 270. As will be appreciated by those of ordinary skill in the art, a pair of Brillouin-scattering-based geometrically linear dual-core waveguide optical amplifiers could be used in conjunction with the general overall layout of the MZI optical amplifier 600 illustrated in FIG. 6.

Figure 9A:
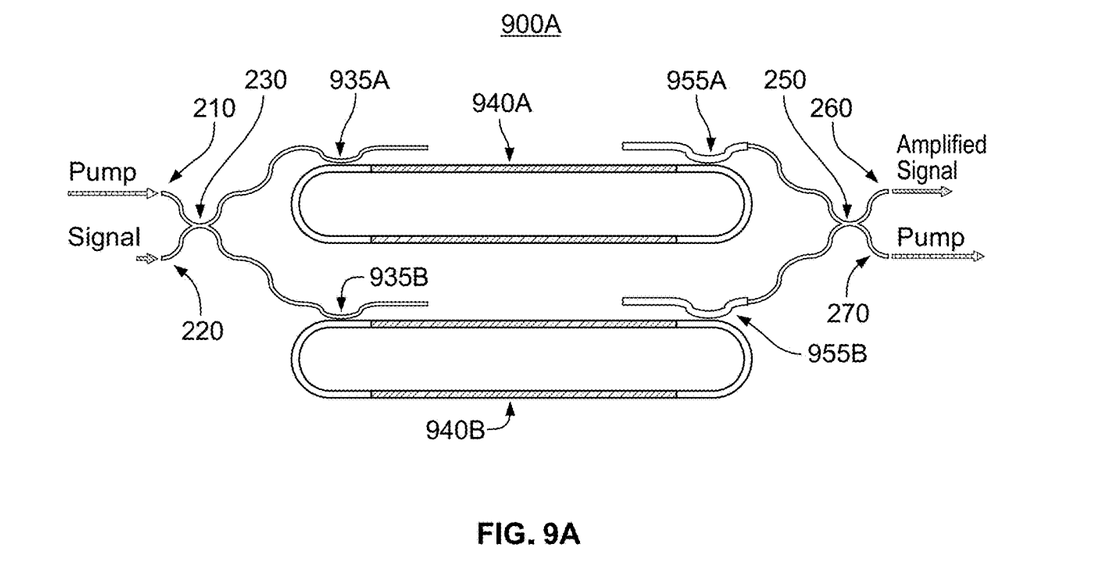
FIGS. 9A-9B illustrate Brillouin-scattering-based optical amplifiers having a Mach-Zehnder Interferometer configuration with multi-spatial-mode racetrack optical amplifiers in accordance with one or more embodiments of the present invention.

While the MZI optical amplifier 200 illustrated in FIG. 2 employs first and second Brillouin-scattering-based geometrically linear optical amplifiers 240A, 240B, the MZI optical amplifier 900A illustrated in FIG. 9A includes first and second multi-spatial-mode racetrack optical amplifiers 940A, 940B. The MZI optical amplifier 900A also includes a pair of multimode input couplers 935A, 935B corresponding to the multimode input coupler 170 illustrated in FIG. 1G, and a pair of mode-selective output couplers 955A, 955B corresponding to the mode-selective output coupler 180 illustrated in FIG. 1G.

The MZI optical amplifier 900A illustrated in FIG. 9A may have certain benefits over the embodiment of the present invention illustrated in FIG. 2. For example, the multi-spatial-mode racetrack optical amplifier configuration embodiment illustrated in FIG. 9A may occupy less real estate on a silicon photonic integrated circuit chip than the geometrically linear configuration embodiment illustrated in FIG. 2. Further, the pair of mode-selective output couplers 955A, 955B are mode-selective, i.e., they are designed to couple strongly to the symmetric (signal) mode and weakly to the antisymmetric (pump) mode. The pair of mode-selective output couplers 955A, 955B therefore yield some additional rejection of the pump beam.

Figure 9B:
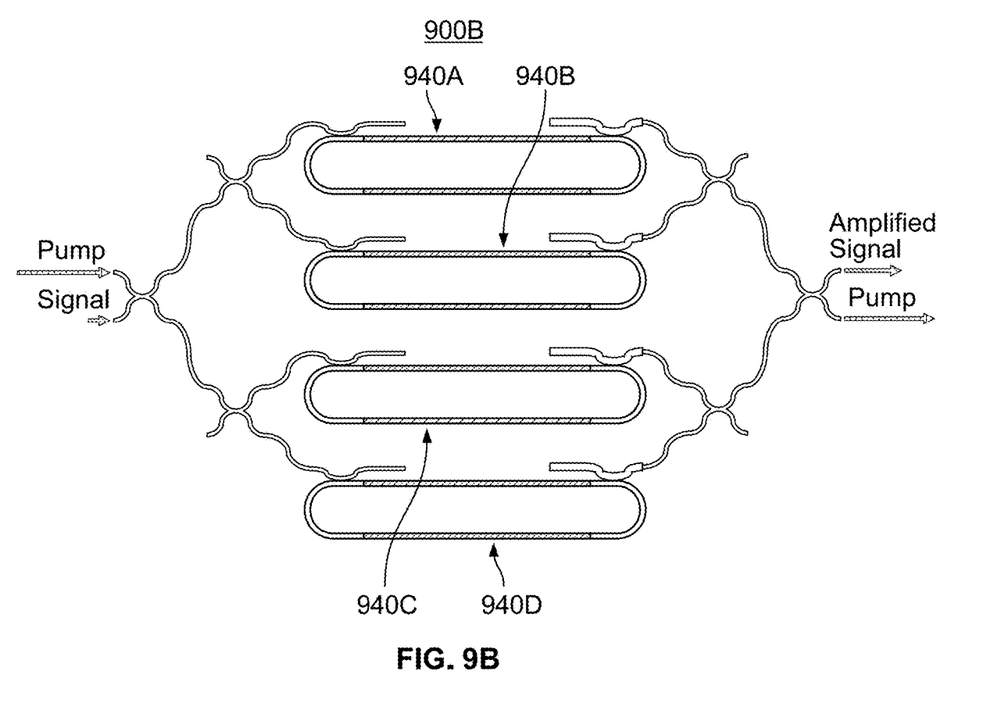

The MZI optical amplifier 900A illustrated in FIG. 9A may be expanded in some embodiments of the present invention in the manner illustrated in FIG. 4, i.e., by including four multi-spatial-mode racetrack optical amplifiers 940A-940D rather than just two, as illustrated in FIG. 9B. As with the embodiment illustrated in FIG. 4, the MZI optical amplifier 900B with four multi-spatial-mode racetrack optical amplifiers 940A-940D will have lower power densities and thus lower non-linear losses for improved gain and power handling.

Because the MZI optical amplifiers 900A, 900B illustrated in FIGS. 9A and 9B are optical resonators, several conditions should be met. The pump beam and the Stokes-shifted signal beam need to be resonant with the antisymmetric and symmetric cavity modes, respectively, of the multi-spatial-mode racetrack optical amplifiers 940A-940D. Further, the pump beam and the Stokes-shifted signal beam must satisfy the Brillouin condition, i.e., $\omega_p - \omega_s = \Omega_b$. To ensure these conditions are met, a phase shifter (not illustrated) may be used, preferably in the curved portions of each of the multi-spatial-mode racetrack optical amplifiers 940A-940D.

Figure 10:
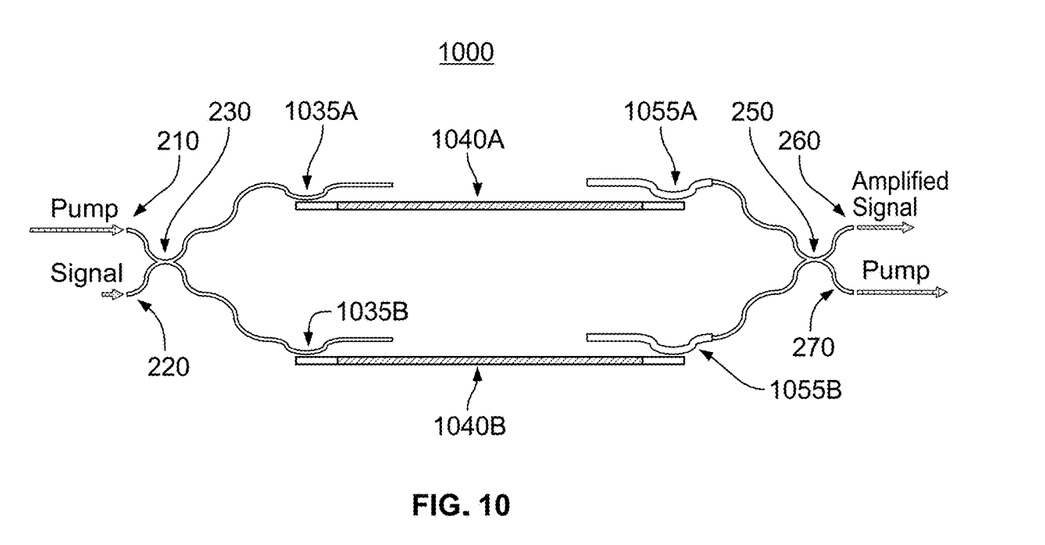
FIG. 10 illustrates a Brillouin-scattering-based optical amplifier having a Mach-Zehnder Interferometer configuration in accordance with one or more embodiments of the present invention.

Due to the desirable wavelength selectivity of the output couplers 955A, 955B, FIG. 10 illustrates a hybrid embodiment of the present invention that employs geometrically linear optical amplifiers and wavelength selective output couplers. This hybrid MZI optical amplifier 1000 includes a pump input port 210, a signal input port 220, an input coupler 230, a pair of multimode input couplers 1035A, 1035B, first and second Brillouin-scattering-based geometrically linear optical amplifiers 1040A, 1040B, a pair of mode-selective output couplers 1055A, 1055B, an output coupler 250, an amplified signal output port 260, and a pump output port 270. As with the multimode input couplers 935A, 935B of the embodiment illustrated in FIG. 9A, the pair of multimode input couplers 1035A, 1035B correspond to the multimode input coupler 170 illustrated in FIG. 1G. Similarly, the pair of mode-selective output couplers 1055A, 1055B correspond to the mode-selective output coupler 180 illustrated in FIG. 1G.

Figure 11:
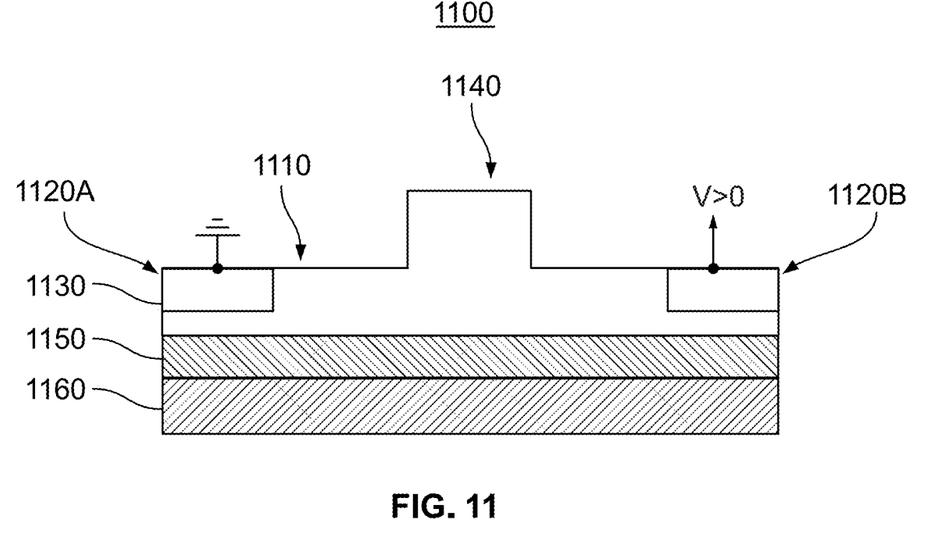
FIG. 11 illustrates a cross-sectional view of a Brillouin-scattering-based geometrically linear optical amplifier implementing carrier sweepout in accordance with one or more embodiments of the present invention.

As non-linear losses due to free carrier absorption reduce performance at higher power levels, sweeping out excess carriers will improve performance. Thus, in some embodiments of the present invention, carrier sweepout is implemented. FIG. 11 illustrates a cross-sectional view of a Brillouin-scattering-based geometrically linear optical amplifier 1100 implementing carrier sweepout. This carrier sweepout is preferably achieved by applying an electric field across the waveguide 1110 using p- and n-doped regions 1120A, 1120B in the membrane 1130 with corresponding contacts. The p- and n-doped regions 1120A, 1120B are located on either side of the undoped (which includes unintentionally doped) central ridge waveguide 1140, resulting in a lateral p-i-n structure. The membrane 1130 and the undoped central ridge waveguide 1140 are suspended over a cavity 1150 formed in the substrate 1160. While FIG. 11 illustrates carrier sweepout implemented in the Brillouin-scattering-based geometrically linear optical amplifier 1100, a similar carrier sweepout design may be implemented in those embodiments having Brillouin-scattering-based racetrack optical amplifiers, including in the curved portions of the multi-spatial-mode racetrack optical amplifiers.

Figure 12:
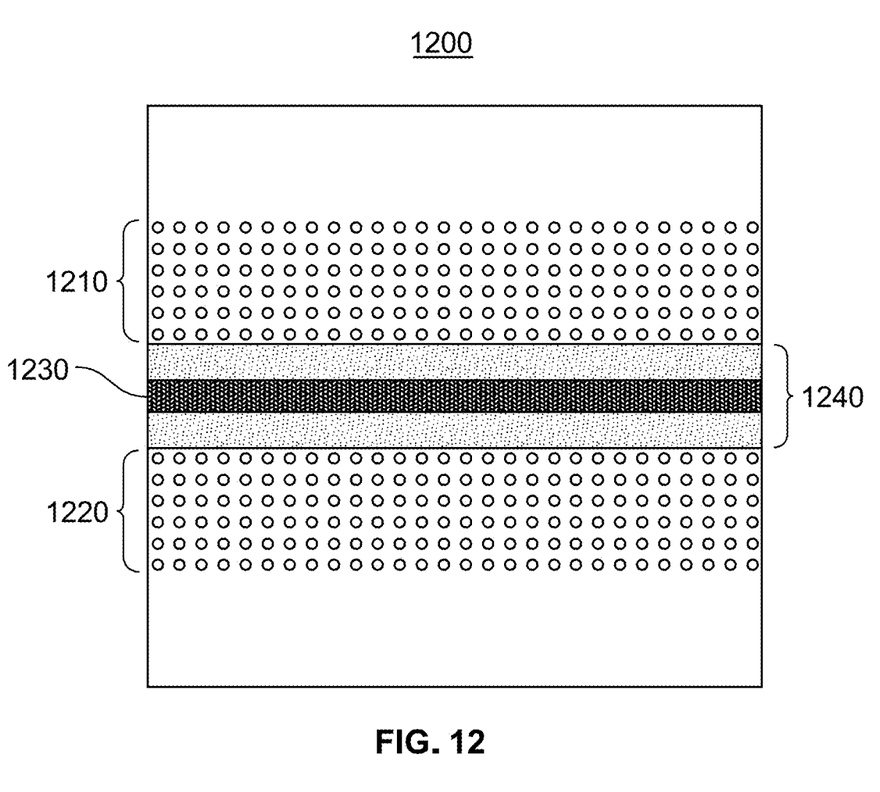
FIG. 12 is a plan view of a waveguide employing phononic crystals in accordance with one or more embodiments of the present invention.

While the embodiment of the present invention illustrated in FIG. 2 employs tethers (not illustrated), such as the tethers 130 as illustrated in FIG. 1A, certain embodiments of the present invention may employ phononic crystals to define the Brillouin-scattering-based geometrically linear optical amplifiers. As illustrated in FIG. 12, the Brillouin-scattering-based geometrically linear optical amplifier 1200 includes a pair of phononic crystals 1210, 1220, one on either side of the central ridge waveguide 1230 and the membrane 1240. As with the tethers 130 illustrated in FIG. 1A, the pair of phononic crystals 1210, 1220 likewise suspend the central ridge waveguide 1230 and membrane 1240 over an underlying cavity (not illustrated).

To the extent that a single Brillouin-scattering-based MZI optical amplifier does not provide sufficient gain or total signal power, two or more Brillouin-scattering-based MZI optical amplifiers may be cascaded in series. As the optical power density increases in the later cascaded Brillouin-scattering-based MZI optical amplifiers, non-linear losses will increase, and thus these later stages will benefit from the use of MZI optical amplifiers of the types illustrated in FIGS. 6 and 9B, each of which lowers the optical power density. Similarly, these later stages will benefit from the use of carrier sweepout, such as that illustrated in FIG. 11.

While the previous embodiments of the present invention employed purely silicon photonic integrated circuit elements, in which the central ridge waveguides of the overall waveguide structures were formed of silicon, other materials may be employed. For example, a central ridge waveguide formed of silicon nitride (SiN) may be employed in certain embodiments, and still be considered part of a silicon photonic integrated circuit.

The optical schematics in FIGS. 9A and 9B illustrate balanced resonant optical amplifiers at pump powers below a certain level. However, with higher pump powers, the devices can lase. With no signal power and sufficiently high pump power, the lasing wavelength is determined by the Brillouin condition in junction with the cavity mode resonances of the multi-spatial-mode racetrack optical amplifiers 940A-940D. However, if a signal with a wavelength very close to this lasing wavelength (or alternatively in frequency within the gain-bandwidth of the multi-spatial-mode racetrack optical amplifiers 940A-940D) is input to the multi-spatial-mode racetrack optical amplifiers 940A-940D, the lasing wavelength will frequency and phase lock to this input signal. This technique is known as injection locking and is a well-known technique of controlling the frequency of lasers. Hence, when injection locked, the outputs at the two mode-selective output couplers 955A, 955B in FIG. 9A or the four mode-selective output couplers in FIG. 9B will be at the same frequency, and ideally at the same phase and amplitude, and combine in a similar manner as if they were simply amplifiers. If there are phase and amplitude differences between the various outputs at the mode-selective output couplers, the techniques illustrated in FIG. 5 may be applied, preferably outside the multi-spatial-mode racetrack optical amplifiers, to increase pump cancellation and signal addition.

As will be appreciated by those of ordinary skill in the art, due to optical reciprocity, the specific order of the individual optical components in various ones of the embodiments may be changed. For example, in the MZI optical amplifier 500 illustrated in FIG. 5, the pair of phase shifters 542A, 542B may be located either upstream (as illustrated) or downstream of the first and second Brillouin-scattering-based geometrically linear optical amplifiers 240A, 240B. In like manner, the pair of optical attenuators 544A, 544B may be located either upstream or downstream (as illustrated) of the first and second Brillouin-scattering-based geometrically linear optical amplifiers 240A, 240B. Further, the pair of phase shifters 542A, 542B and/or pair of optical attenuators 544A, 544B may be included, for example, in various MZI optical amplifiers 200, 300, 400, 600, 800, 900A, 900B, 1000. In like manner, the variable pre-input and/or post-output couplers in the embodiments illustrated in FIGS. 3 and 4 may be included in various MZI optical amplifiers 500, 600, 800, 900A, 900B, 1000.

While the disclosed embodiments have all employed Brillouin-scattering-based optical amplifiers, the invention is not limited to just optical amplifiers based upon Brillouin-scattering. For example, the various embodiments could employ other optical amplifier technologies in which the signal and pump beams have wavelengths that are reasonably close to one another (within approximately 100 nm). As specific examples, the Brillouin-scattering-based optical amplifiers could be replaced by Raman-based integrated waveguide optical amplifiers or Erbium-doped integrated waveguide optical amplifiers. As will be appreciated by those of ordinary skill in the art, one of the primary requirements in these alternative optical amplifier embodiments is that the input and output couplers be able to create an approximately 50:50 split between the input beams.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A Mach-Zehnder interferometer optical amplifier comprising:
   an input coupler adapted to receive an input signal and a pump beam, the input coupler adapted to couple approximately a 50:50 split of the input signal and the pump beam to each of first and second input coupler outputs;
   first and second optical amplifiers including respective first and second optical amplifier inputs optically connected to respective first and second input coupler outputs, each of the first and second optical amplifiers adapted to optically amplify the input signal and output the thus amplified input signal from respective first and second optical amplifier outputs; and
   an output coupler optically connected to the first and second optical amplifier outputs, the output coupler adapted to couple approximately all of the amplified input signal to an amplified signal output port and to couple approximately all of a remaining portion of the pump beam to a pump output port;
   wherein the Mach-Zehnder interferometer optical amplifier is a silicon photonic integrated circuit.

2. The Mach-Zehnder interferometer optical amplifier of claim 1, wherein each of the first and second optical amplifiers includes one of a Brillouin-scattering-based optical amplifier, a Raman-based integrated waveguide optical amplifier, and an Erbium-doped integrated waveguide optical amplifier.

3. The Mach-Zehnder interferometer optical amplifier of claim 1 further comprising:
   at least one post-output phase shifter, each of the at least one post-output phase shifters optically coupled to a respective one of the amplified signal output port and the pump output port, each of the at least one post-output phase shifters adapted to shift a phase of a received optical beam; and
   a post-output coupler, the post-output coupler optically coupled to the at least one post-output phase shifter, the post-output coupler adapted to couple approximately all of the amplified input signal to an amplified signal post-output port and to couple approximately all of the remaining portion of the pump beam to a pump post-output port.

4. The Mach-Zehnder interferometer optical amplifier of claim 1, wherein at least one of the first and second optical amplifiers includes a phase shifter, the phase shifter adapted to shift a phase of a received optical beam.

5. The Mach-Zehnder interferometer optical amplifier of claim 1, wherein at least one of the first and second optical amplifiers includes an optical attenuator, the optical attenuator adapted to attenuate an optical magnitude of a received optical beam.

6. The Mach-Zehnder interferometer optical amplifier of claim 1, wherein each of the first and second optical amplifiers has a geometrically linear configuration.

7. The Mach-Zehnder interferometer optical amplifier of claim 6, wherein each optical amplifier having the geometrically linear configuration comprises:
   a multimode input coupler optically connected to a respective one of the first and second input coupler outputs;
   a geometrically linear optical amplifier, the multimode input coupler adapted to optically couple a portion of the input signal and a portion of the pump beam to the geometrically linear optical amplifier; and
   a mode-selective output coupler adapted to optically couple the amplified input signal from the geometrically linear optical amplifier to a respective one of the first and second optical amplifier outputs.

8. The Mach-Zehnder interferometer optical amplifier of claim 1, wherein each of the first and second optical amplifiers has a racetrack configuration, each optical amplifier having the racetrack configuration comprising:

a multimode input coupler optically connected to a respective one of the first and second input coupler outputs;

a multi-spatial-mode racetrack optical amplifier, the multimode input coupler adapted to optically couple a portion of the input signal and a portion of the pump beam to the multi-spatial-mode racetrack optical amplifier, the multi-spatial-mode racetrack optical amplifier including:

first and second geometrically linear optical amplifiers; and first and second curved waveguides, the first and second curved waveguides configured to form an oval with the first and second geometrically linear optical amplifiers; and a mode-selective output coupler adapted to optically couple the amplified input signal from the multi-spatial-mode racetrack optical amplifier to a respective one of the first and second optical amplifier outputs.

9. The Mach-Zehnder interferometer optical amplifier of claim 1, wherein each of the first and second optical amplifiers comprises a Brillouin-scattering-based optical amplifier, each of the Brillouin-scattering-based optical amplifiers including:

a membrane;

a central ridge waveguide on the membrane, the central ridge optical waveguide optically connected to a respective one of the first and second input coupler outputs, the central ridge optical waveguide optically connected to a respective one of the first and second optical amplifier outputs; and one or more tethers or phononic crystals, the one or more tethers or phononic crystals adapted to suspend the membrane and the central ridge waveguide over a cavity.

10. The Mach-Zehnder interferometer optical amplifier of claim 9, wherein the membrane includes:
a p-doped region along a first side of the membrane; and an n-doped region along a second side of the membrane opposite the first side, the p-doped region and the n-doped region each adapted to receive a bias to sweepout carriers; and wherein the central ridge waveguide is undoped.

11. The Mach-Zehnder interferometer optical amplifier of claim 1, wherein the first and second optical amplifiers comprise a Brillouin-scattering-based amplifier, the Brillouin-scattering-based amplifier including:

a membrane;

a first central ridge waveguide on the membrane, the first central ridge optical waveguide optically connected to the first input coupler output, the first central ridge optical waveguide optically connected to the first optical amplifier output;

a second central ridge waveguide on the membrane, the second central ridge waveguide being parallel to the first central ridge waveguide, the second central ridge optical waveguide optically connected to the second input coupler output, the second central ridge optical waveguide optically connected to the second optical amplifier output; and one or more tethers or phononic crystals, the one or more tethers or phononic crystals adapted to suspend the membrane, the first central ridge waveguide, and the second central ridge waveguide over a cavity.

12. A Mach-Zehnder interferometer optical amplifier comprising:

a first stage input coupler adapted to receive an input signal and a pump beam, the first stage input coupler adapted to couple approximately a 50:50 split of the input signal and the pump beam to each of first and second first stage input coupler outputs;

a pair of second stage input couplers, each of the pair of second stage input couplers optically connected to a respective one of the first and second first stage input coupler outputs, each of the pair of second stage input couplers adapted to couple approximately a 50:50 split of the input signal received from a respective one of the first and second first stage input coupler outputs and the pump beam received from a respective one of the first and second first stage input coupler outputs to each of first and second second stage input coupler outputs;

first through fourth optical amplifiers including respective first through fourth optical amplifier inputs optically connected to a respective one of the second stage input coupler outputs, each of the first through fourth optical amplifiers adapted to amplify the input signal and output the thus amplified input signal from respective first through fourth optical amplifier outputs;

a pair of second stage output couplers optically connected to the first through fourth optical amplifier outputs, each of the pair of second stage output couplers adapted to couple approximately all of the amplified input signal to a second stage output coupler amplified signal output port and to couple approximately all of a remaining portion of the pump beam to a second stage output coupler pump output port; and a first stage output coupler optically connected to each of the second stage output coupler amplified signal output ports, the first stage output coupler adapted to couple approximately all of the amplified input signal to a first stage output coupler amplified signal output port and to couple approximately all of a remaining portion of the pump beam to a first stage output coupler pump output port;

wherein the Mach-Zehnder interferometer optical amplifier is a silicon photonic integrated circuit.

13. The Mach-Zehnder interferometer optical amplifier of claim 12, wherein each of the first through fourth optical amplifiers has a geometrically linear configuration.

14. The Mach-Zehnder interferometer optical amplifier of claim 13, wherein each optical amplifier having the geometrically linear configuration comprises:

a multimode input coupler optically connected to a respective output of one of the pair of second stage input couplers;

a geometrically linear optical amplifier, the multimode input coupler adapted to optically couple a portion of the input signal and a portion of the pump beam to the geometrically linear optical amplifier; and a mode-selective output coupler adapted to optically couple the amplified input signal from the geometrically linear optical amplifier to a respective one of the first through fourth optical amplifier outputs.

15. The Mach-Zehnder interferometer optical amplifier of claim 12, wherein each of the first through fourth optical amplifiers has a racetrack configuration, each optical amplifier having the racetrack configuration comprising:

a multimode input coupler optically connected to a respective output of one of the pair of second stage input couplers;

a multi-spatial-mode racetrack optical amplifier, the multimode input coupler adapted to optically couple a portion of the input signal and a portion of the pump beam to the multi-spatial-mode racetrack optical amplifier, the multi-spatial-mode racetrack optical amplifier including:
  first and second geometrically linear optical amplifiers; and
  first and second curved waveguides, the first and second curved waveguides configured to form an oval with the first and second geometrically linear optical amplifiers; and
a mode-selective output coupler adapted to optically couple the amplified input signal from the multi-spatial-mode racetrack optical amplifier to a respective one of the first through fourth optical amplifier outputs.

16. A Mach-Zehnder interferometer optical amplifier comprising:
  a first stage Mach-Zehnder Interferometer (MZI), the first stage MZI including:
    a first stage MZI input coupler, the first stage MZI input coupler adapted to receive an input signal and a pump beam, the first stage MZI input coupler adapted to couple approximately a 50:50 split of the input signal and the pump beam to each of first and second first stage MZI input coupler outputs;
    at least one first stage MZI phase shifter, each of the at least one first stage MZI phase shifters optically connected to a respective one of the first and second first stage MZI input coupler outputs, each of the at least one first stage MZI phase shifters adapted to shift a phase of a received optical beam; and
  a second stage MZI, the second stage MZI including:
    a second stage MZI input coupler optically connected to the first stage MZI, the second stage MZI input coupler adapted to couple approximately a 50:50 split of the input signal and the pump beam to each of first and second second stage MZI input coupler outputs;
    first and second optical amplifiers including respective first and second optical amplifier inputs optically connected to respective first and second second stage MZI input coupler outputs, the first and second optical amplifiers each adapted to amplify the input signal and output the thus amplified input signal from respective first and second optical amplifier outputs; and
    a second stage MZI output coupler optically connected to the first and second optical amplifier outputs, the second stage MZI output coupler adapted to couple approximately all of the amplified input signal to a second stage MZI amplified signal output port and to couple approximately all of a remaining portion of the pump beam to a second stage MZI pump output port;
  wherein the Mach-Zehnder interferometer optical amplifier is a silicon photonic integrated circuit.

17. The Mach-Zehnder interferometer optical amplifier of claim 16, wherein each of the first and second optical amplifiers has a geometrically linear configuration.

18. The Mach-Zehnder interferometer optical amplifier of claim 17, wherein each optical amplifier having the geometrically linear configuration comprises:
  a multimode input coupler optically connected to a respective one of the first and second second stage MZI input coupler outputs;
  a geometrically linear optical amplifier, the multimode input coupler adapted to optically couple a portion of the input signal and a portion of the pump beam to the geometrically linear optical amplifier; and
  a mode-selective output coupler adapted to optically couple the amplified input signal from the geometrically linear optical amplifier to a respective one of the first and second optical amplifier outputs.

19. The Mach-Zehnder interferometer optical amplifier of claim 16, wherein each of the first and second optical amplifiers has a racetrack configuration, each optical amplifier having the racetrack configuration comprising:
  a multimode input coupler optically connected to a respective one of the first and second second stage MZI input coupler outputs;
  a multi-spatial-mode racetrack optical amplifier, the multimode input coupler adapted to optically couple a portion of the input signal and a portion of the pump beam to the multi-spatial-mode racetrack optical amplifier, the multi-spatial-mode racetrack optical amplifier including:
    first and second geometrically linear optical amplifiers; and
    first and second curved waveguides, the first and second curved waveguides configured to form an oval with the first and second geometrically linear optical amplifiers; and
  a mode-selective output coupler adapted to optically couple the amplified input signal from the multi-spatial-mode racetrack optical amplifier to a respective one of the first and second optical amplifier outputs.

20. The Mach-Zehnder interferometer optical amplifier of claim 16, further comprising:
  a third stage MZI, the third stage MZI including:
    at least one third stage MZI phase shifter, each of the at least one third stage MZI phase shifters optically connected to a respective one of the second stage MZI amplified signal output port and the second stage MZI pump output port, each of the at least one third stage MZI phase shifters adapted to shift a phase of a received optical beam; and
    a third stage MZI output coupler optically connected to the at least one third stage MZI phase shifter, the third stage MZI output coupler adapted to couple approximately all of the amplified input signal to a third stage MZI amplified signal output port and to couple approximately all of a remaining portion of the pump beam to a third stage MZI pump output port.

* * * * *